United States Patent
Ramachandran et al.

(10) Patent No.: US 12,425,753 B2
(45) Date of Patent: Sep. 23, 2025

(54) GROUPING OF OPTICAL PASSBANDS FOR LOADING IN AN OPTICAL TRANSMISSION SPECTRUM USING AN AFFINITY IDENTIFIER

(71) Applicant: Infinera Corp., San Jose, CA (US)

(72) Inventors: Sanjeev Ramachandran, Karnataka (IN); Ashok Kunjidhapatham, Devarachikkanahalli (IN); Anil Naduvile Veedu, Kerala (IN); Nandini Hanumanthagowda, Karnataka (IN)

(73) Assignee: Infinera Corp.

( * ) Notice: Subject to any disclaimer, the term of this patent is extended or adjusted under 35 U.S.C. 154(b) by 161 days.

(21) Appl. No.: 18/146,684

(22) Filed: Dec. 27, 2022

(65) Prior Publication Data

US 2023/0247334 A1  Aug. 3, 2023

Related U.S. Application Data

(60) Provisional application No. 63/305,742, filed on Feb. 2, 2022.

(51) Int. Cl.
*H04Q 11/00* (2006.01)

(52) U.S. Cl.
CPC ..... *H04Q 11/0062* (2013.01); *H04Q 11/0005* (2013.01); *H04Q 2011/0086* (2013.01)

(58) Field of Classification Search
CPC .................................................. H04Q 11/0005
See application file for complete search history.

(56) References Cited

U.S. PATENT DOCUMENTS

| | | | |
|---|---|---|---|
| 7,394,953 B1 | 7/2008 | Nagarajan et al. | |
| 7,995,921 B2 | 8/2011 | Grubb | |
| 8,014,686 B2 | 9/2011 | Rahn et al. | |
| 8,155,531 B2 | 4/2012 | Murthy et al. | |
| 8,223,803 B2 | 7/2012 | Sprague | |
| 8,639,118 B2 | 1/2014 | Wu et al. | |
| 9,154,258 B1 | 10/2015 | Mertz et al. | |
| 2012/0082453 A1 | 4/2012 | Wu et al. | |
| 2019/0064437 A1* | 2/2019 | Matsuyama | H04B 10/60 |
| 2020/0169348 A1* | 5/2020 | Satou | H04Q 11/0005 |

\* cited by examiner

*Primary Examiner* — Shi K Li

(57) ABSTRACT

A system and method are described herein. The system comprises a wavelength selective switch having a minimum passband width; a processor; and a memory storing a datastore and processor-executable instructions that when executed cause the processor to: receive a connection request comprising an optical channel; determine an affinity group ID of an affinity group associated with the requested optical channel, the affinity group being associated with two or more adjacent optical channels having a combined channel width equal to or greater than the minimum passband width; create a loading group based on the two or more adjacent optical channels associated with the affinity group; receive a loading request to load the optical channel associated with the affinity group; and in response to receiving the loading request, load the two or more adjacent optical channels associated with the affinity group.

19 Claims, 5 Drawing Sheets

GROUPING OF OPTICAL PASSBANDS FOR LOADING IN AN OPTICAL TRANSMISSION SPECTRUM USING AN AFFINITY IDENTIFIER

CROSS-REFERENCE TO RELATED APPLICATION/INCORPORATION BY REFERENCE

This application claims priority to U.S. Provisional Patent Application No. 63/305,742, filed Feb. 2, 2022, the entire content of which is incorporated herein by reference in its entirety.

BACKGROUND

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Optical communication systems typically include a first node that supplies optical signals carrying user information or data to a second node that receives such optical signals via an optical communication path that connects the first node to the second node. In certain optical communication systems, the first node is a so-called hub node that communicates with a plurality of second nodes, also referred to as leaf nodes. The optical communication paths that connect the hub with multiple leaf nodes may include one or more segments of optical fiber connected to one another by various optical components or sub-systems, such as optical amplifiers, optical splitters and combiners, optical multiplexers and demultiplexers, and optical switches, for example, wavelength selective switches (WSS). The optical communication path and its associated components may be referred to as a line system.

In certain optical communication systems, user limitations and/or hardware limitations at one or more optical node may cause optical fragmentation within the optical signal of the optical communications path.

For example, in Layer-0 ROADM networks, a loading algorithm may be used to systematically load 25 GHz passbands on an optical signal. Due to hardware limitations, such as hardware from different vendors or the use of legacy hardware, a WSS within the optical communications path may operate with a minimum passband width of 37.5 GHz, resulting in a 12.5 GHz optical fragment where other data cannot be loaded into the optical signal.

Optical fragments, by limiting the amount of data that can be loaded on an optical signal, reduce the overall bandwidth of the optical signal. Thus, a need exists for systems and methods for mitigating or eliminating optical fragmentation of optical signals in optical communications systems. It is to such systems and methods the present disclosure is directed.

SUMMARY

The problems of mitigating or eliminating optical fragmentation of optical signals in optical communications systems are addressed by the systems and methods disclosed herein. The system comprises a wavelength selective switch having a minimum passband width; a processor; and a memory. The memory comprises a non-transitory processor-readable medium storing a datastore and processor-executable instructions that when executed by the processor cause the processor to: receive a connection create request comprising at least one optical channel; determine an affinity group ID of an affinity group associated with the requested at least one optical channel, the affinity group being associated with two or more adjacent optical channels, the two or more adjacent optical channels having a combined channel width equal to or greater than the minimum passband width of the wavelength selective switch; create a loading group based on the two or more adjacent optical channels associated with the affinity group; receive a loading request to load the at least one optical channel associated with the affinity group; and, in response to receiving the loading request to load the at least one optical channel associated with the affinity group, load the two or more adjacent optical channels associated with the affinity group.

In another aspect, in accordance with some implementations, the disclosure describes a method. The method comprises receiving a connection create request comprising at least one optical channel; assigning a passband affinity group ID to the at least two optical channels thereby forming a passband affinity group, the at least two optical channels having a combined channel width greater than the minimum passband width; creating a loading group based on passbands in the affinity group; determining a sequence to load or unload the requested optical channels; receiving a loading request to load the at least one optical channel associated with the affinity group; and, in response to the loading request to load the optical channel associated with the affinity group, load optical channels associated with the affinity group.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
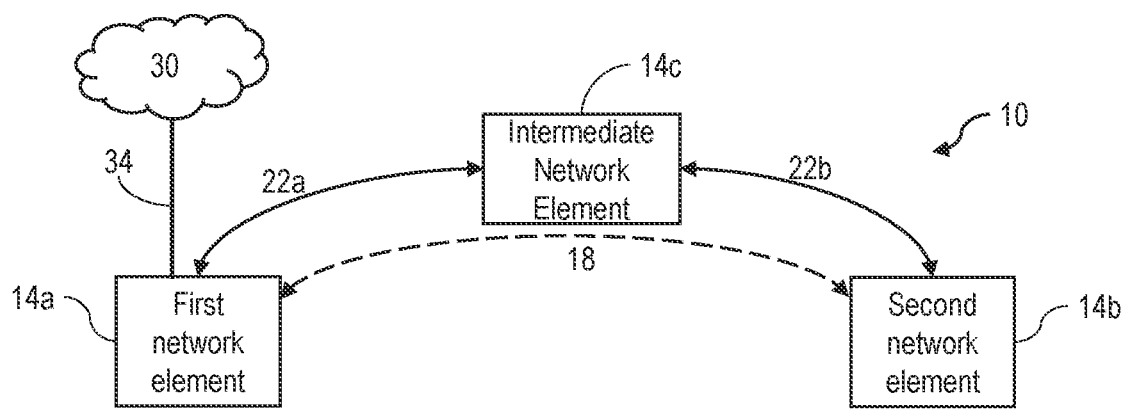
FIG. 1 is a block diagram of an exemplary embodiment of an optical transport network constructed in accordance with the present disclosure.

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

Software may include one or more computer readable instruction that when executed by one or more component, e.g., a processor, causes the component to perform a specified function. It should be understood that the algorithms described herein may be stored on one or more non-transitory processor-readable medium, which is also referred to herein as a non-transitory memory. Exemplary non-transitory processor-readable mediums may include random-access memory (RAM), a read only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1528.6 nm and about 1566.9 nm. The L-Band is a band of light having a wavelength between about 1569.2 nm and about 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHz, 3.125 GHz, etc.). For example, a 4.8 terahertz ("THz") frequency band may include 382 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channel may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A wavelength Selective Switch is a programmable device having source and destination fiber ports where the source and destination fiber ports and associated attenuation can be specified for a particular passband with a minimum bandwidth.

A passband is a portion of an optical signal the WSS passes from a source fiber port to the destination fiber port. A passband comprises one or more slice and has a passband width based on the number of slices the WSS passes from the source fiber port to the destination fiber port. As such, a minimum passband width is the same as the minimum bandwidth of the WSS.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via colorless, directionless, and contentionless (CDC) wavelength selective switches (WSS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

Referring now to the drawings, and in particular to FIG. 1, shown therein is a diagram of an exemplary embodiment of an optical transport network 10 constructed in accordance with the present disclosure. The optical transport network 10 is depicted as having a plurality of network elements 14a-n, including a first network element 14a, a second network element 14b, and an intermediate network element 14c. Data transmitted within the optical transport network 10 from the first network element 14a to the second network element 14b may travel along an optical path 18 formed from a first optical fiber link 22a, the intermediate network element 14c, and, a second optical fiber link 22b to the second network element 14b.

In one embodiment, a user may interact with a computer system 30, e.g., via a user device, that may be used to communicate with one or more of the network elements 14a-n (hereinafter "network element 14") via a communication network 34.

In some embodiments, the computer system 30 (described below in reference to FIG. 2 in more detail) may comprise a processor and a memory having a data store that may store data such as network element version information, firmware version information, sensor data, system data, metrics, logs, tracing, and the like in a raw format as well as transformed data that may be used for tasks such as reporting, visualization, analytics etc. The data store may include structured data from relational databases, semi-structured data, unstructured data, time-series data, and binary data. The data store may be a data base, a remote accessible storage, or a distributed filesystem. In some embodiments, the data store may be a component of an enterprise network.

In some embodiments, the computer system 30 is connected to one or more network element 14 via the communication network 34. In this way, the computer system 30 may communicate with each of the one or more network element 14, and may, via the communication network 34 transmit or receive data from each of the one or more network element 14. In other embodiments, the computer system 30 may be integrated into each network element 14 and/or may communicate with one or more pluggable card within the network element 14. In some embodiments, the computer system 30 may be a remote network element.

The communication network 34 may be almost any type of network. For example, in some embodiments, the communication network 34 may be a version of an Internet network (e.g., exist in a TCP/IP-based network). In one embodiment, the communication network 34 is the Internet. It should be noted, however, that the communication network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 34 is the Internet, a primary user interface of the computer system 30 may be delivered through a series of web pages or private internal web pages of a company or corporation, which may be written in hypertext markup language, JavaScript, or the like, and accessible by the user. It should be noted that the primary user interface of the computer system 30 may be another type of interface including, but not limited to, a Windows-based application, a tablet-based application, a mobile web interface, a VR-based application, an application running on a mobile device, and/or the like. In one embodiment, the communication network 34 may be connected to one or more of the user device, computer system 30, and the network elements 14a-n.

The optical transport network 10 may be, for example, considered as a graph made up of interconnected individual nodes (that is, the network elements 22). If the optical transport network 10 is an optical transport network, the optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical transport network 10 may perform one or more functions described as being performed by another one or more of the devices of the optical transport network 10. Devices of the computer system 30 may interconnect via wired connections, wireless connections, or a combination thereof. For example, in one embodiment, the user device and the computer system 30 may be integrated into the same device, that is, the user device may perform functions and/or processes described as being performed by the computer system 30, described below in more detail.

Figure 2:
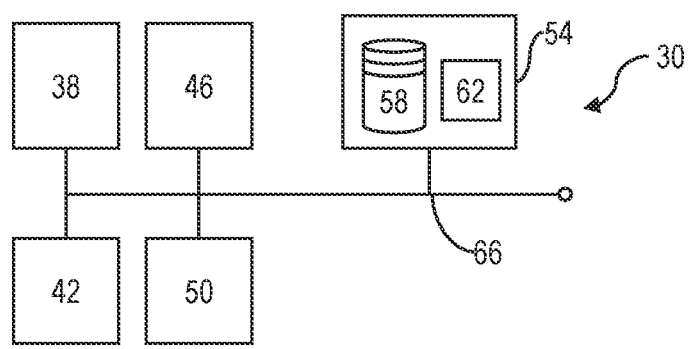
FIG. 2 is a diagram of an exemplary embodiment of a computer system shown in FIG. 1 and constructed in accordance with the present disclosure.

Referring now to FIG. 2, shown therein is a diagram of an exemplary embodiment of the computer system 30 constructed in accordance with the present disclosure. In some embodiments, the computer system 30 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 30 may include one or more input device 38 (hereinafter "input device 38"), one or more output device 42 (hereinafter "output device 42"), one or more processor 46 (hereinafter "processor 46"), one or more communication device 50 (hereinafter "communication device 50") capable of interfacing with the communication network 34, one or more non-transitory processor-readable medium (hereinafter "memory 54") storing processor-executable code and/or software application(s) 58, a database 62, for example including, a web browser capable of accessing a website and/or communicating information and/or data over a wireless or wired network (e.g., the communication network 34), and/or the like. The input device 38, the output device 42, the processor 46, the communication device 50, and the memory 54 may be connected via a path 66 such as a data bus that permits communication among the components of the computer system 30.

In some embodiments, the processor 46 may comprise one or more processor 46 working together, or independently, to read and/or execute processor executable code and/or data, such as stored in the memory 54. The processor 46 may be capable of creating, manipulating, retrieving, altering, and/or storing data structures into the memory 54. Each element of the computer system 30 may be partially or completely network-based or cloud-based, and may or may not be located in a single physical location.

Exemplary embodiments of the processor 46 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 46 may be capable of communicating with the memory 54 via the path 66 (e.g., data bus). The processor 46 may be capable of communicating with the input device 38 and/or the output device 42.

The processor 46 may be further capable of interfacing and/or communicating with the network elements 14 via the communication network 34 using the communication device 50. For example, the processor 46 may be capable of communicating via the communication network 34 by exchanging signals (e.g., analog, digital, optical, and/or the like) via one or more ports (e.g., physical or virtual ports) using a network protocol to provide information to the one or more network element 14.

The memory 54 may store an application 58 that, when executed by the processor 46, causes the computer system 30 to perform an action such as communicate with or control one or more component of the computer system 30, the optical transport network 10 (e.g., the one or more network element 14a-n) and/or the communication network 34.

In some embodiments, the memory 54 may be located in the same physical location as the computer system 30, and/or one or more memory 54 may be located remotely from the computer system 30. For example, the memory 54 may be located remotely from the computer system 30 and communicate with the processor 46 via the communication network 34. Additionally, when more than one memory 54 is used, a first memory may be located in the same physical location as the processor 46, and additional memory may be located in a location physically remote from the processor 46. Additionally, the memory 54 may be implemented as a "cloud" non-transitory processor-readable storage memory (i.e., one or more of the memory 54 may be partially or completely based on or accessed using the communication network 34).

The input device 38 may be capable of receiving information input from the user, another computer, and/or the processor 46, and transmitting such information to other components of the computer system 30 and/or the communication network 34. The input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 42 may be capable of outputting information in a form perceivable by the user, another computer system, and/or the processor 46. For example, implementations of the output device 42 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 38 and the output device 42 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

The communication network 34 may permit bi-directional communication of information and/or data between the computer system 30 and/or the network elements 14 of the optical transport network 10. The communication network 34 may interface with the computer system 30 and/or the network elements 14 in a variety of ways. For example, in some embodiments, the communication network 34 may interface by optical and/or electronic interfaces, and/or may use a plurality of network topographies and/or protocols including, but not limited to, Ethernet, TCP/IP, circuit switched path, combinations thereof, and/or the like. The communication network 34 may utilize a variety of network protocols to permit bi-directional interface and/or communication of data and/or information between the computer system 30 and/or the network elements 14.

In one embodiment, the database 62 may be a time-series database, a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 62 can be centralized or distributed across multiple systems.

Figure 3A:
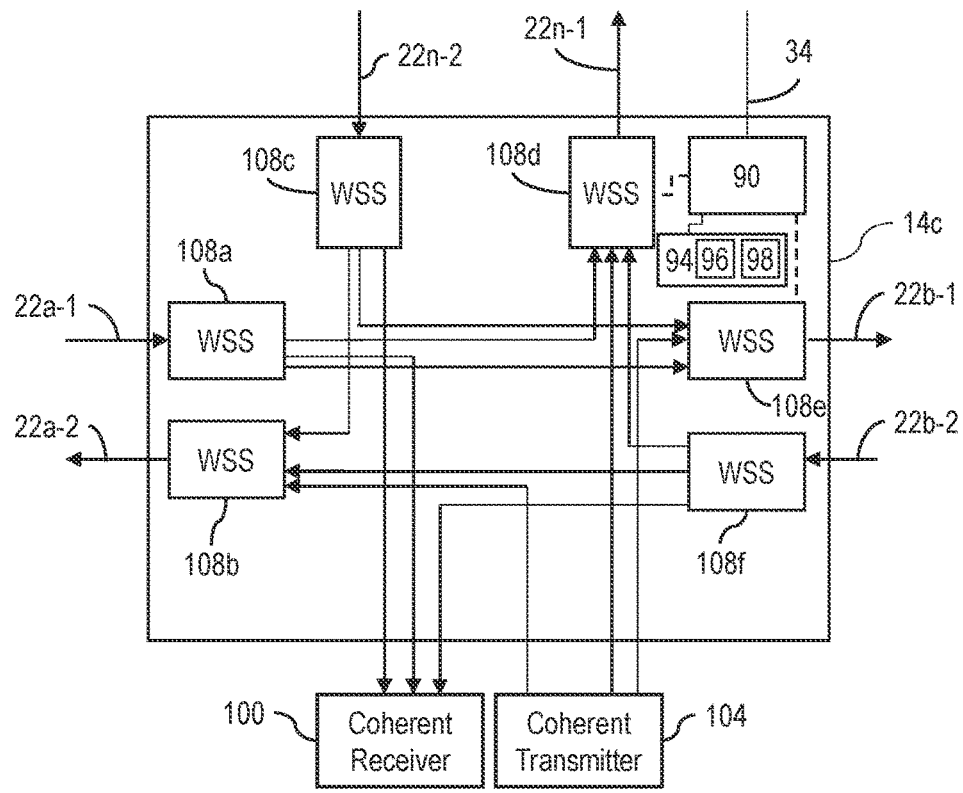
FIG. 3A is a block diagram of an exemplary embodiment of the network element constructed in accordance with the present disclosure.

Referring now to FIG. 3A, shown therein is a block diagram of an exemplary embodiment of the network element 14 constructed in accordance with the present disclosure. In general, the network element 14 transmits and receives data traffic and control signals.

The network element 14 can be implemented in a variety of ways. Nonexclusive examples include optical line terminals (OLTs), optical cross connects (OXCs), optical line amplifiers, optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

FIG. 3A illustrates an example of the intermediate network element 14c being a ROADM that interconnects the first optical fiber link 22a and the second optical fiber link 22b, and an optional one of the optical fiber link 22n. Optical fiber links 22a, 22b, 22n may include optical fiber pairs, wherein each fiber of the pair carries optical signal groups propagating in opposite directions. As seen in FIG. 3A, for example, first optical fiber link 22a includes a first optical fiber 22a-1, which carries optical signals toward intermediate network element 14c, and a second optical fiber 22a-2 that carries optical signals output from the intermediate network element 14c. Similarly, optical fiber link 22n may include optical fibers 22n-1 and 22n-2 carrying optical signal groups to and from the intermediate network element 14c, respectively. Further, second optical fiber link 22b may include first (22b-1) and second (22b-2) optical fibers also carrying optical signals from and to the intermediate network element 14c, respectively. Additional nodes, not shown in FIG. 3A, may be provided that supply optical signal groups to and receive optical signal groups from the intermediate network element 14c. Such nodes may also have a ROADM having the same or similar structure as that of the intermediate network element 14c.

As further shown in FIG. 3A, a coherent receiver 100 (described below in more detail and shown in FIG. 3B) and a coherent transmitter 104 (described below in more detail and shown in FIG. 3C) may be provided and in communication with the intermediate network element 14c to drop and add optical signal groups, respectively.

As shown in FIG. 3A, the intermediate network element 14c may include a plurality of wavelength selective switches (WSSs 108), such as WSSs 108a-f. Wavelength selective switches are known components that can dynamically route, block and/or attenuate received optical signal groups input from and output to optical fiber links 22a-n. In addition to transmitting/receiving optical signal groups from network elements 14, optical signal groups may also be input from or output to the coherent transmitter 104 and coherent receiver 100, respectively.

In one embodiment, each WSS 108 may include a reconfigurable, optical filter operable to allow a passband (e.g., particular bandwidth of the spectrum of the optical signal) to pass through or be routed as herein described. Each WSS 108 may have a minimum passband, that is, each WSS 108 may have a minimum bandwidth of the spectrum of the optical signal of which the WSS 108 can allow to pass or otherwise be routed. The minimum passband is a frequency and may be independent of the optical channel width. The relationship between optical channels and passbands is described in more detail below in reference to FIG. 4.

As further shown in FIG. 3A, each WSS 108a-f can receive optical signal groups and selectively direct such optical signal groups to other WSSs for output from the intermediate network element 14c. For example, WSS 108a may receive optical signal groups on optical communication path 22a-1 and supply certain optical signal groups to WSS 108e, while others are supplied to WSS 108d. Those supplied to WSS 108e may be output to a downstream network element 14, such as the second network element 14b (FIG. 1) on optical communication path 22b-1, while those supplied to WSS 108d may be output to another network element 14 (not shown) on optical communication path 22n-1. Also, optical signal groups input to the intermediate network element 14c on optical communication path 22b-2 may be supplied by WSS 108f to either WSS 108b and on to the first network element 14a via optical communication path 22a-2 or WSS 108d and on to another network element 14 (not shown) via optical communication path 22n-1. Moreover, WSS 108c may selectively direct optical signal groups input to the intermediate network element 14c from optical communication path 22n-2 to either WSS 108b and onto the first network element 14a via optical communication path 22a-2 or to WSS 108e and onto the second network element 14b via optical communication path 22b-1.

WSSs 108a, 108c, and 108f may also selectively or controllably supply optical signal groups to the coherent receiver 100 and optical signal groups may be selectively output from the coherent transmitter 104 in the intermediate network element 14c. The optical signal groups output from the coherent transmitter 104 may be selectively supplied to one or more of WSSs 108b, 108d, and 108e, for output on to optical communication paths 22a-2, 22n-1, and 22b-1, respectively.

In one embodiment, the intermediate network element 14c further comprises a processor 90 and a non-transitory computer readable medium referred to herein as memory 94. The processor 90 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 90 is in communication with the memory 94 and may be operable to read and/or write to the memory 94. The processor 90 may be capable of communicating with one or more of the WSSs 108 (shown as in communication with the WSS 108d and the WSS 108e for simplicity, however, the processor 90 may be in communication with each WSS 108). The processor 90 may be further capable of interfacing and/or communicating with the network elements 14 via the communication network 34. For example, the processor 90 may be capable of communicating via the communication network 34 by exchanging signals (e.g., analog, digital, optical, and/or the like) via one or more ports (e.g., physical or virtual ports) using a network protocol to provide information to the one or more network element 14.

In one embodiment, the memory 94 may store an application 96 that, when executed by the processor 90, causes the processor 90 to perform an action, for example, communicate with or control one or more component of the network element 14 such as control one or more of the WSS 108.

In one embodiment, the memory 94 may store one or more datastore 98. The datastore 98 may include, for example, structured data from relational databases, semi-structured data, unstructured data, time-series data, binary data, and the like and/or some combination thereof. The datastore 98 may be a data base, a remote accessible storage, or a distributed filesystem. In some embodiments, the datastore 98 may be a component of an enterprise network.

Figure 3B:
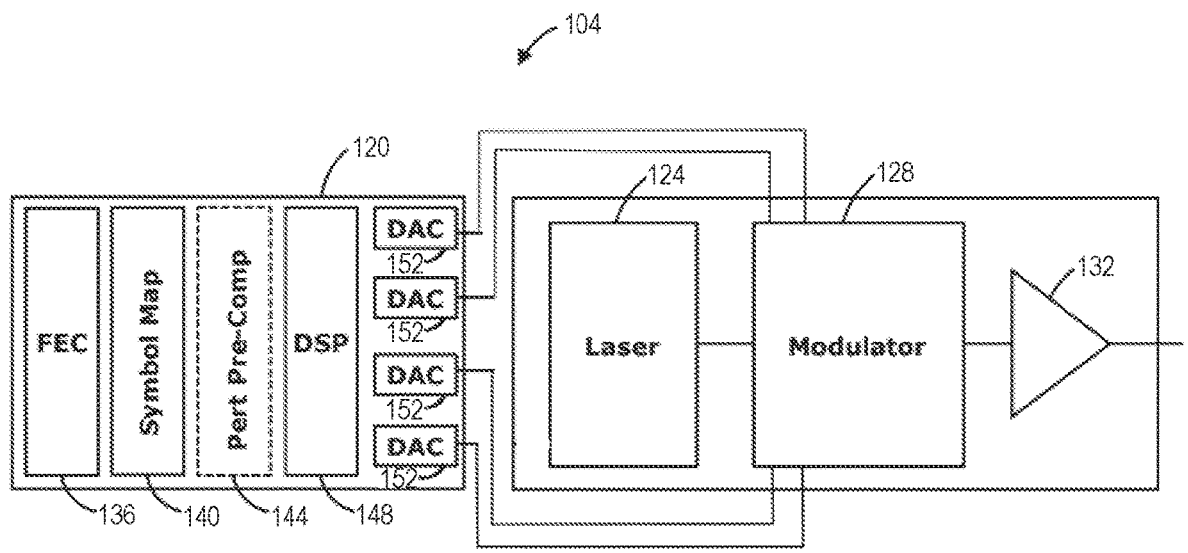
FIG. 3B is a diagram of an exemplary embodiment of the coherent transmitter of FIG. 3A constructed in accordance with the present disclosure.

Referring now to FIG. 3B, shown therein is a diagram of an exemplary embodiment of the coherent transmitter 104 of FIG. 3A constructed in accordance with the present disclosure. The coherent transmitter 104 may comprise one or more transmitter processor circuit 120, one or more laser 124, one or more modulator 128, one or more semiconductor optical amplifier 132, and/or other components (not shown).

The transmitter processor circuit 120 may have a Transmitter Forward Error Correction (FEC) circuitry 136, a Symbol Map circuitry 140, a transmitter perturbative pre-compensation circuitry 144, one or more transmitter digital signal processor (DSP) 148, and one or more digital-to-analogue converters (DAC) 152. The transmitter processor circuit 120 may be located in any one or more components of the coherent transmitter 104, or separate from the components, and/or in any location(s) among the components. The transmitter processor circuit 120 may be in the form of one or more Application Specific Integrated Circuit (ASIC), which may contain one or more module and/or custom module.

Processed electrical outputs from the transmitter processor circuit 120 may be supplied to the modulator 128 for encoding data into optical signals generated and supplied to the modulator 128 from the laser 124. The semiconductor optical amplifier 132 receives, amplifies, and transmits the optical signal including encoded data in the spectrum. Processed electrical outputs from the transmitter processor circuit 120 may be supplied to other circuitry in the transmitter processor circuit 120, for example, clock and data modification circuitry. The laser 124, modulator 128, and/or semiconductor optical amplifier 132 may be coupled with a tuning element (e.g., a heater) (not shown) that can be used to tune the wavelength of an optical signal channel output by the laser 124, modulator 128, or semiconductor optical amplifier 132. In some implementations, a single one of the laser 124 may be shared by multiple coherent transmitters 104.

Other possible components in the coherent transmitter 104 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Figure 3C:
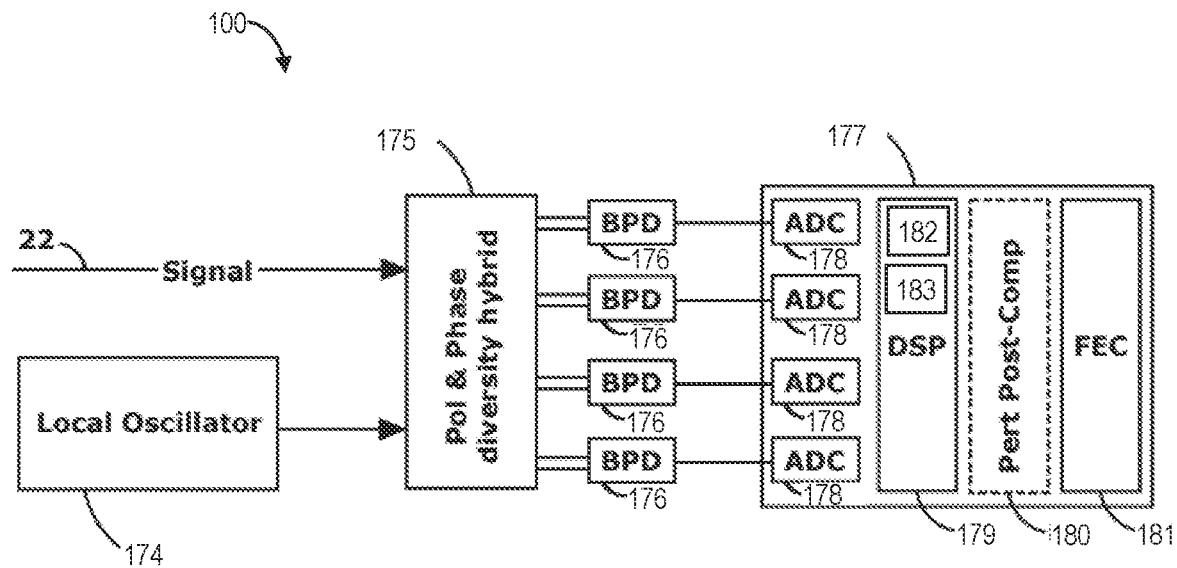
FIG. 3C is a block diagram of an exemplary embodiment of the coherent receiver constructed in accordance with the present disclosure.

Referring now to FIG. 3C, shown therein is a block diagram of an exemplary embodiment of the coherent receiver 100 constructed in accordance with the present disclosure. The coherent receiver 100 may comprise one or more local oscillator 174, a polarization and phase diversity hybrid circuit 175 receiving the one or more channel from the optical signal and the input from the local oscillator 174, one or more balanced photodiode 176 that produces electrical signals representative of the one or more channel on the spectrum, and one or more receiver processor circuit 177. Other possible components in the coherent receiver 100 may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The coherent receiver 100 may be implemented in other ways, as is well known in the art. Exemplary embodiments of the coherent receiver 100 are further described in U.S. Pat. No. 8,014,686, titled "Polarization Demultiplexing Optical Receiver Using Polarization Oversampling and Electronic Polarization Tracking".

The one or more receiver processor circuit 177, may comprise one or more analog-to-digital converter (ADC) 178 receiving the electrical signals from the balanced photodiodes 176, one or more receiver digital signal processor (DSP) 179, receiver perturbative post-compensation circuitry 180, and receiver forward error correction (FEC) circuitry 181. The receiver FEC circuitry 181 may apply corrections to the data, as is well known in the art. The one or more receiver processor circuit 177 and/or the one or more receiver DSP 179 may be located on one or more component of the coherent receiver 100 or separately from the components, and/or in any location(s) among the components. The receiver processor circuit 177 may be in the form of an Application Specific Integrated Circuit (ASIC), which may contain one or more module and/or custom module. In one embodiment, the receiver DSP 179 may include, or be in communication with, one or more processor 182 and one or more memory 183 storing processor readable instructions, such as software, or may be in communication with the processor 90 and the memory 94.

The one or more receiver DSP 179 receives and processes the electrical signals with multi-input-multiple-output (MIMO) circuitry, as described, for example, in U.S. Pat. No. 8,014,686, titled "Polarization demultiplexing optical receiver using polarization oversampling and electronic polarization tracking". Processed electrical outputs from receiver DSP 179 may be supplied to other circuitry in the receiver processor circuit 177, such as the receiver perturbative post-compensation circuitry 180 and the receiver FEC circuitry 181.

Various components of the coherent receiver 100 may be provided or integrated, in one example, on a common substrate. Further integration is achieved by incorporating various optical demultiplexer designs that are relatively compact and conserve space on the surface of the substrate.

In use, the one or more channel of the spectrum may be subjected to optical non-linear effects between the coherent transmitter 104 and the coherent receiver 100 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 171 and the receiver perturbative post-compensation circuitry 180. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler" herein incorporated by reference in its entirety, by use of analysis of one or more incoming channel at the coherent receiver 100.

Figure 3D:
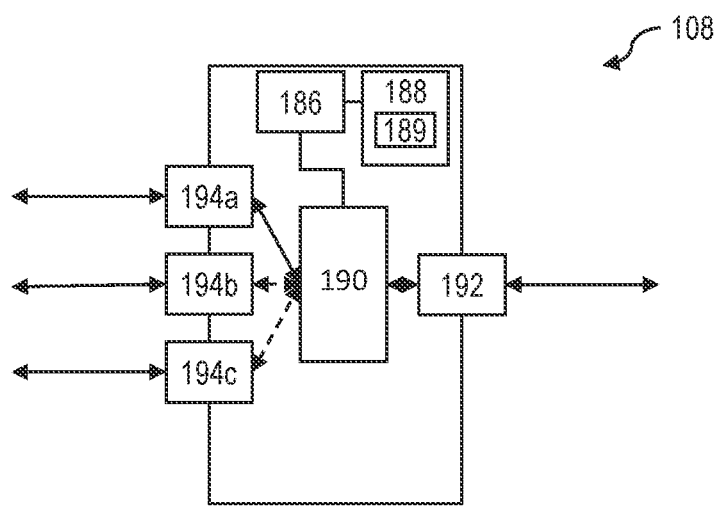
FIG. 3D is a diagram of an exemplary embodiment of the wavelength selective switch constructed in accordance with the present disclosure.

Referring now to FIG. 3D, shown therein is a diagram of an exemplary embodiment of the WSS 108 constructed in accordance with the present disclosure. The WSS 108 generally comprises a processor 186 in communication with a memory 188 and a reconfigurable filter 190. The reconfigurable filter 190 is in optical communication with a combined port 192 and two or more discrete ports 194 (shown in FIG. 3D as discrete port 194a, discrete port 194b, and discrete port 194c).

In one embodiment, the memory 188 is constructed in accordance with the memory 54 and/or the memory 94 as described above in more detail. The memory 188 comprises a non-transitory processor-readable medium storing processor-executable instructions such as a WSS controls application 189. The WSS controls application 189 includes instructions that, when executed by the processor 186, cause the processor 186 to control the reconfigurable filter 190, that is, to configure the reconfigurable filter 190 to create a passband from an optical signal. In one embodiment, the memory 188 may store a data indicative of a minimum passband width that the reconfigurable filter 190 is operable to create. The processor 186 may further be operable to communicate the data indicative of the minimum passband width.

In one embodiment, the reconfigurable filter 190 is one or more reconfigurable filter 190 operable to selectively transmit or reflect light of a selected passband, i.e., contiguous wavelengths of light, thus allowing the WSS 108 to switch between different passbands of light.

In a first aspect, an incoming optical signal having multiple optical channels enters the combined port 192 and is directed to the reconfigurable filter 190. The incoming optical signal is split into one or more segments by the filter, each segment having a bandwidth between the minimum passband width and the bandwidth of the incoming optical signal. The one or more segments of the incoming optical signal are the directed to one or more discrete port 194. For example, the WSS 108a of FIG. 3A, may have the first optical fiber 22a-1 connected to the combined port 192 and the reconfigurable filter 190 may direct one or more selected passband to one or more of the WSS 108d via the discrete port 194a, the WSS 108e via the discrete port 194b, and/or the coherent receiver 100 via discrete port 194c.

In a second aspect, a first incoming optical signal enters the discrete port 194a, a second incoming optical signal enters the discrete port 194b, and a third incoming optical signal enters the discrete port 194c and each incoming optical signal is directed to the reconfigurable filter 190. The reconfigurable filter 190, as directed by the processor 186, may combine the first incoming optical signal, the second incoming optical signal, and the third incoming optical signal into a combined optical signal that is sent to the combined port 192. For example, the WSS 180b of FIG. 3A, my have the second optical fiber 22a-2 connected to the combined port 192 to receive the combined optical signal from the reconfigurable filter 190. The reconfigurable filter 190 may receive the first incoming optical signal from the WSS 108c via the discrete port 194a, the second incoming optical signal from the WSS 108f via the discrete port 194b, and the third incoming optical signal from the coherent transmitter 104 via the discrete port 194c.

While each of the above aspects and the illustration of the WSS 108 in FIG. 3D show the WSS 108 with only three discrete ports 194, a person having ordinary skill in the art would recognize that the WSS 108 may have as few as two discrete ports 194 and as may discrete ports 194 as the reconfigurable filter 190 is operable to selectively output or combine.

Figure 4:
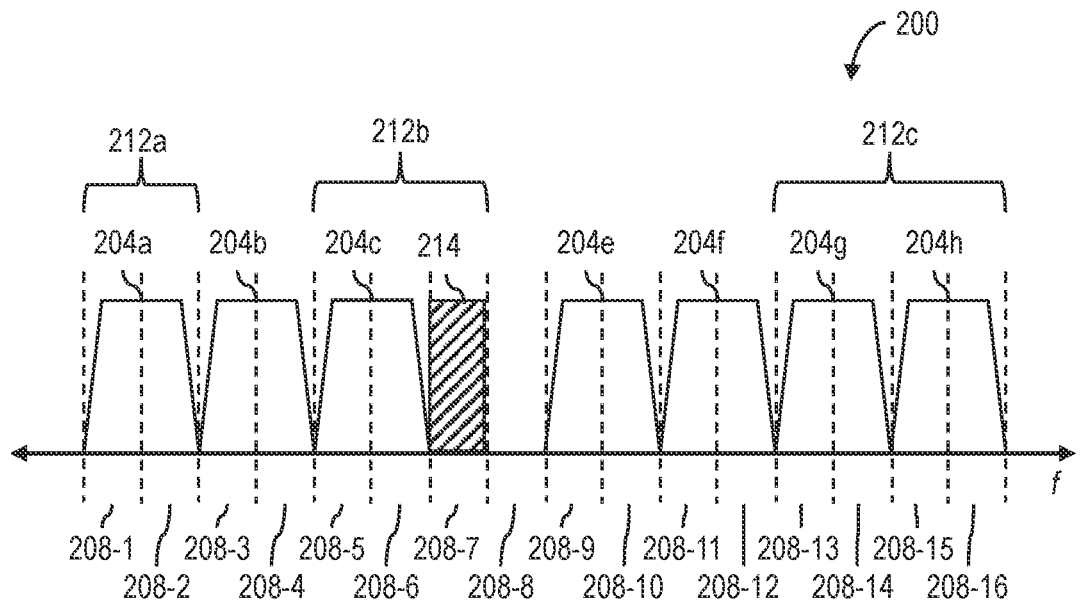
FIG. 4 is a partial diagram of an exemplary embodiment of a segment of an optical signal constructed in accordance with the present disclosure.

Referring now to FIG. 4, shown therein is a partial diagram of an exemplary embodiment of a segment 200 of an optical signal constructed in accordance with the present disclosure. The segment 200 of the optical signal comprises one or more optical channel 204 (shown in FIG. 4 as optical channels 204a-h). Each optical channel 204 comprises one or more spectral slice 208 (shown in FIG. 4 as spectral slice 208-1 to spectral slice 208-16). Thus, shown in FIG. 4, the optical channel 204a comprises spectral slice 208-1 and spectral slice 208-2, the optical channel 204b comprises spectral slice 208-3 and spectral slice 208-4, continuing on in this manner through the optical channel 204h comprising the spectral slice 208-15 and the spectral slice 208-16 (with the exception of optical channel 204d as detailed below).

Each spectral slice 208 may represent a predetermined spectrum of a particular size in a frequency band, such that, for example, all spectral slices 208 may be one of 25 GHz, 12.5 GHz, 6.25 GHz, 3.125 GHz, and the like. As shown in FIG. 4, each spectral slice 208 is, by way of example, a 12.5 GHz spectral slice; therefore, each optical channel 204 is 25 GHz in width and the portion of the optical signal 200 has a bandwidth of 200 GHz. While the segment 200 of the optical signal is shown as having a 200 GHz width, the optical signal may have a width of about 4.8 THz, for example, resulting in about 384 of the spectral slices 208 and about 192 of the optical channels 204.

In one embodiment, further shown in FIG. 4 is a first passband 212a comprising the spectral slice 208-1 and the spectral slice 208-2; a second passband 212b comprising the spectral slice 208-5, the spectral slice 208-6, and the spectral slice 208-7; and a third passband 212c comprising the spectral slices 208-13 through 208-16. The first passband 212a has a first passband width of 25 GHz (if each slice has a width of 12.5 GHz); the second passband 212b has a second passband width of 37.5 GHz; and the third passband 212c has a third passband width of 50 GHz. Each optical channel 204, however, has a bandwidth of 25 GHz. Thus, the first passband 212a encompasses the optical channel 204a with no unused bandwidth difference between the first passband width of the first passband 212a and the optical channel 204a and the third passband 212c encompasses the optical channel 204g and the optical channel 204h with not unused bandwidth difference between the third passband width of the third passband 212c and a combined bandwidth of the optical channel 204g and the optical channel 204h. The first passband 212a and the third passband 212c may thus be said to be fully utilized. The second passband 212b, however, encompasses the optical channel 204c as well as 12.5 GHz of unused bandwidth (e.g., the size of the spectral slice 208-7 which is encompassed by the second passband 212b but not carrying data in an optical channel 204). The second passband 212b may thus be said to be fragmented and the spectral slice 208-7 may be referred to as a spectral fragment 214.

In some embodiments, the spectral fragment 214 may occur when an optical channel is activated for a particular WSS 108, such as the optical channel 204c, has a bandwidth less than the minimum passband width of the particular WSS 108 (for example, when the minimum passband width of the WSS 108 is the width of the second passband 212b). The spectral fragment 214 may also occur when a combined bandwidth for contiguous and adjacent optical channels 204 activated for a particular WSS 108 is less than the minimum passband width for that particular WSS 108.

Figure 5:
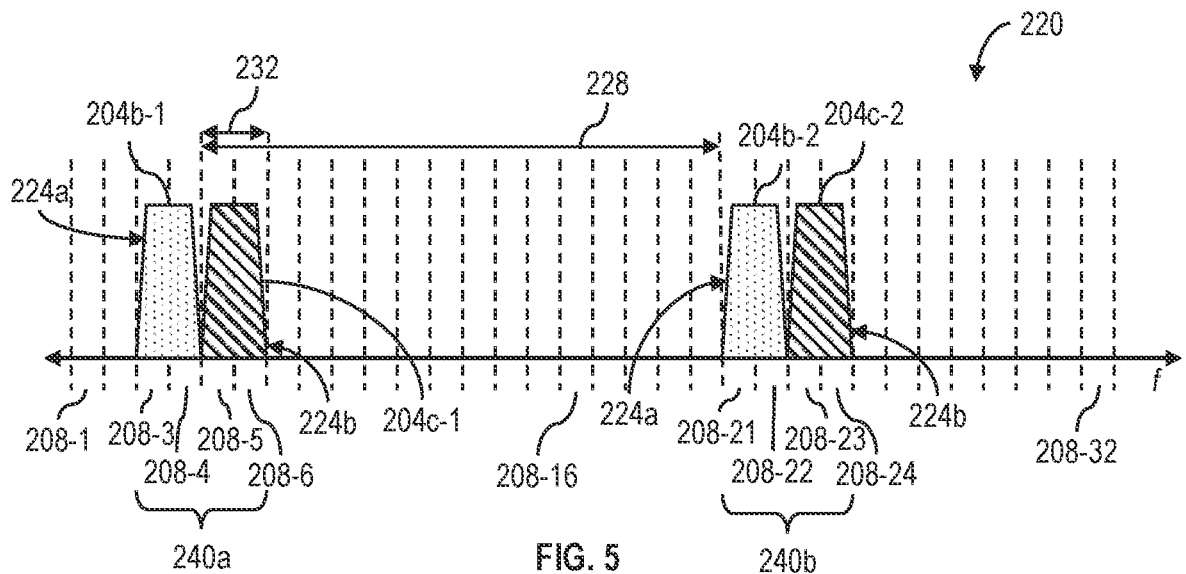
FIG. 5 is a partial diagram of an exemplary embodiment of a second segment of an optical signal constructed in accordance with the present disclosure.

Referring now to FIG. 5, shown therein is a partial diagram of an exemplary embodiment of a second segment 220 of the optical signal constructed in accordance with the present disclosure. The second segment 220 of the optical signal is shown with 32 spectral slices 208 (with selected ones of the spectral slices 208 labeled for simplicity). The second segment 220 encompasses over twice the bandwidth of the segment 200 of FIG. 4.

The second segment 220 is shown with two optical channel groups 224, however, additional ones of the optical channel group 224 may be included in the second segment 220 such that the number of optical channel groups 224 present may be limited by a channel spread 228 and a channel width 232. Each optical channel group 224 is a collection of optical channels 204 having the channel spread 228 (or a multiple of the channel spread 228) between each consecutive optical channel 204. The second segment 220 includes a first optical channel group 224a comprising a first optical channel 204b-1 and a second optical channel 204b-2 and a second optical channel group 224b comprising a first optical channel 204c-1 and a second optical channel 204c-2.

In one embodiment, the channel spread 228 is a distance, in frequency f, between a first optical channel and a second optical channel of a particular one of the optical channel group 224. As shown in FIG. 5, the first optical channel group 224a comprises the first optical channel 204b-1 and the second optical channel 204b-2 with the channel spread 228 of 16 spectral slices 208, or 200 GHz if each spectral slice 208 has a width of 12.5 GHz.

In one embodiment, the channel width 232 is a bandwidth of a particular one of the optical channel 204, shown in FIG. 5 as the first optical channel 204c-1. As shown, the channel width 232 is equal to the width of the spectral slice 208-5 and the spectral slice 208-6. Thus, when the spectral slices 208 have a width of 12.5 GHz, for example, the channel width 232 is 25 GHz.

In one embodiment, each optical channel group 224 comprises 10 optical channels 204. For example, the first optical channel group 224a may comprise optical channel 204b-1 through optical channel 204b-10 (optical channels 204b-3 through 204b-10 not shown for simplicity).

In one embodiment, when the channel width 232 of the first optical channel 204b-1 of the first optical channel group 224a is smaller, i.e., has a smaller bandwidth, than the minimum passband width of the WSS 108, the first optical channel 204c-1 of the second optical channel group 224b is adjacent to, and to be loaded at the same point in time as, the first optical signal 204b-1 of the first optical channel group 224a, and the combined channel width of the first optical channel 204b-1 and the first optical channel 204c-1 is equal to or greater than the minimum passband width of the WSS 108, then the first optical channel 204b-1 of the first optical channel group 224a and the first optical channel 204c-1 of the second optical channel group 224b may form a first affinity group 240a and may each be assigned a first affinity group ID. By loading the first optical channel 204b-1 and the first optical channel 204c-1 simultaneously, as described below as a part of a loading group, the present disclosure solves the problems associated with the spectral fragment 214 thereby enhancing the data carrying capacity of the optical transport network 10.

Because the channel spread 228 is the same between the optical channels 204 of the first optical channel group 224a and the second optical channel group 224b, if the first optical channel 204b-1 and the first optical channel 204c-1 are adjacent to one another in the optical spectrum, each optical channel 204b at a first channel index of the first optical channel group 224a will be adjacent a respective optical channel 204c at the first channel index of the second optical channel group 224b such that the $x^{th}$ optical channel 204b-x of the first optical channel group 224a is adjacent the $x^{th}$ optical channel 204c-x of the second optical channel group 224b, where X is the channel index of the optical channel 204 within the optical channel group 224. Thus, each pair of optical channels 204 having the same channel index in the optical channel group 224 may form an $x^{th}$ affinity group 240x and be assigned an affinity group ID. To that end, for example, the second optical channel 204b-2 of the first optical channel group 224a and the second optical channel 204c-2 of the second optical channel group 224b may form a second affinity group 240b and may each be assigned a second affinity group ID.

In one embodiment, each passband 212 to be implemented by the WSS 108 is stored as a passband entry, e.g., in the datastore 98 or the memory 94. The passband entry may include, for example, a passband ID, an affinity group ID, a start frequency, and either an end frequency or a bandwidth. The passband ID may be data indicative of a particular passband implemented by a particular one of the WSS 108. For example, if the passband entry is stored in the memory 94 or, for example, in the datastore 98, the passband entry may further include a WSS identifier to indicate which WSS 108 the passband is to be implemented on. Alternatively, the passband entry may be stored in the memory 188.

In one embodiment, each affinity group ID for each affinity group is stored in memory as an affinity group entry, e.g., by the processor 90 in the memory 94 and may be stored, for example, in the datastore 98 or by the processor 186 in the memory 188. The affinity group entry may include, for example, the affinity group ID and two or more passband IDs indicative of the passbands that are associated with the passband affinity group.

In one embodiment, the affinity group entry has an affinity format 300, which forms a unique entry in the memory (e.g., the memory 94 and/or the memory 188). In some embodiments, the affinity group entry is the affinity group ID wherein information regarding the passband affinity group is encoded in the affinity group ID.

Figure 6:
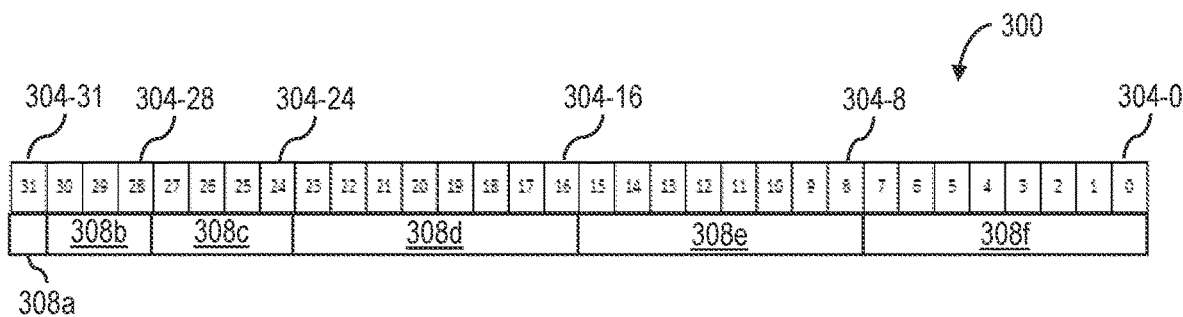
FIG. 6 is a diagram of an exemplary embodiment of an affinity group ID format constructed in accordance with the present disclosure.

Referring now to FIG. 6, shown therein is a diagram of an exemplary embodiment of the affinity format 300 (hereinafter affinity format 300) constructed in accordance with the present disclosure. The affinity format 300 may comprise a 32-bit identifier (e.g., bit 304-0 through bit 304-31) although other numbers of bits in the identifier may be used. The affinity format 300 includes an ownership indicator 308a in the most significant bit of the affinity group entry (e.g., bit 304-31) indicative of whether a particular affinity group ID is managed by a user (e.g., when the ownership indicator is a '0') or by the system, or processor 90, (e.g., when the ownership indicator is a '1'). The remainder of the affinity format 300 is a group ID.

In one embodiment, when the affinity group ID is user-managed (e.g., when the particular affinity group ID was established by the user), the group ID is configured by the user for the passband. When the affinity group ID is system-managed, the group ID may be further defined.

In one embodiment, when the affinity group ID is system-managed, the affinity group ID may further include reserved space indicator 308b, an entity type indicator 308c, a first entity indicator 308d, a second entity indicator 308e, and a passband index indicator 308f. The reserved space indicator 308b extends from the twenty-eighth bit 304-28 for three bits 304 to the ownership indicator 308a. The entity type indicator 308c extends from the twenty-fourth bit 304-24 for four bits 304 to the reserved space indicator 308b. The first entity indicator 308d extends from the sixteenth bit 304-16 for 8 bits to the entity type indicator 308c. The second entity indicator 308e extends from the eighth bit 304-8 for 8 bits to the first entity indicator 308d. And the passband index indicator 308f extends from the zeroth bit 304-0 for eight bits to the second entity indicator 308e.

In one embodiment, the entity type indicator 308c is data, i.e., 4 bits, indicative of a "parent" or "source" of the passband. Typically, and as used hereinafter, the entity type indicator 308c is designated to indicate an "optical channel group" type because the remaining data in the affinity format 300 (i.e., bits 304-0 through 304-23) are based on how the optical channels 204 are positioned in the optical channel group 224. Four bits of space provides up to 16 possible entity types. In one embodiment, the combined bits from bit 304-0 through bit 304-24, may collectively be referred to as entity data and may have an entity data format. The entity data format of the entity data is based at least in part on the entity type indicator 308c. Therefore, because the entity type indicator 308c is indicative of an "optical channel group" entity, the entity data format of the entity data is herein described.

In one embodiment, the first entity indicator 308d is data, i.e., 8 bits, indicative of a system-generated ID for the entity identified by the entity type indicator 308c, that is, the first entity indicator 308d is the system-generated ID for the optical channel group 224, e.g., the first optical channel group 224a. Similarly, the second entity indicator 308e is data, i.e., 8 bits, indicative of a system-generated ID for the optical channel group 224, e.g., the second optical channel group 224b.

In one embodiment, the passband index indicator 308f is data, i.e., 8 bits, indicative of the channel index of the optical channels 204 that together form the affinity group. For example, referring back to FIG. 5, if an affinity group were formed between the optical channel 204 at the first index of the first optical channel group 224a (i.e., the first optical channel 204b-1) and the optical channel 204 at the first index for the second optical channel group 224b (i.e., the first optical channel 204c-1), the passband index indicator 308f comprises data indicative of the first index.

Figure 7:
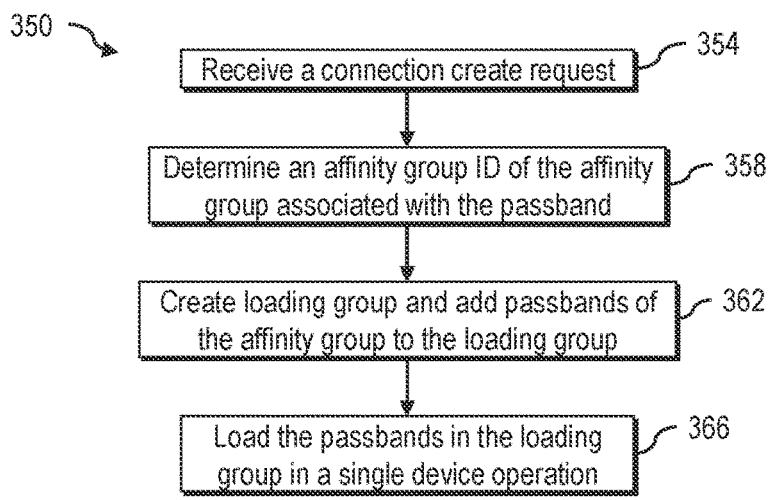
FIG. 7 is a flow diagram of an exemplary embodiment of a process constructed in accordance with the present disclosure.

Referring now to FIG. 7, shown therein is a flow diagram of an exemplary embodiment of a process 350 constructed in accordance with the present disclosure. The process 350 generally comprises the steps of: receiving a connection create request (step 354); determining the affinity group ID of the affinity group associated with the passband (step 358); creating a loading group based on passbands in the affinity group (step 362); and loading the passbands in the loading group in a single device operation (step 366). Generally, the process 350 may be implemented as processor-executable code stored in the memory 94, for example, as the application 96, and executed by the processor 90.

In one embodiment, receiving a connection create request (step 354) comprises receiving the connection create request by the processor 90, e.g., via the communication network 34.

In one embodiment, the connection create request is a request or notification to prepare the network element 14 to receive and/or transmit one or more optical channel. The connection create request may include, for example, a passband ID indicative of an intent to bring up, or activate, one or more optical channel between the start frequency and end frequency of a passband corresponding to the passband ID. For example, the connection create request may have a passband ID, or is otherwise indicative of, the first optical channel 204b-1 (shown in FIG. 5).

In one embodiment, receiving a connection create request (step 354) comprises receiving the connection create request by the processor 186, e.g., via the processor 90. In one embodiment, the connection create request is a request or notification to load one or more optical channel into the optical signal. The connection create request may include, for example, a start frequency and an end frequency of one or more optical channels.

In one embodiment, determining the affinity group ID of the affinity group associated with the passband (step 358) comprises comparing a passband ID for the passband against one or more affinity group entry in the datastore 98, the memory 94, and/or the memory 188. If the passband ID is associated with an affinity group ID, continue to creating a loading group based on passbands in the affinity group (step 362).

In one embodiment, creating a loading group based on passbands in the affinity group (step 362) comprises creating the loading group with the ID provided by the affinity group ID and add each passband associated with the affinity group ID to the loading group. In this way, all optical channels that are part of a particular affinity passband group (e.g., based on the affinity group ID) are included in the same loading group. For example, the affinity group ID may be associated with the first optical channel 204b-1 and the first optical channel 204c-1 (shown in FIG. 5). The loading group, then, may include both the first optical channel 204b-1 and the first optical channel 204c-1.

In one embodiment, creating a loading group based on passbands in the affinity group (step 362) comprises creating the loading group such that the width of the loading group is greater than the minimum passband width of the WSS 108 through which the optical signal having the optical channel is routed.

In one embodiment, loading the passbands in the loading group in a single device operation (step 366) comprises causing the WSS 108 to provide a passband for a particular degree with the width of the loading group, where the width of the loading group is greater than the minimum passband width of the WSS 108. For example, loading the passbands for the loading group may include loading a passband having a width of the combined width of the first optical channel 204b-1 and the first optical channel 204c-1, e.g., loading a passband for the spectral slices 208-3 through 208-6.

Figure 8:
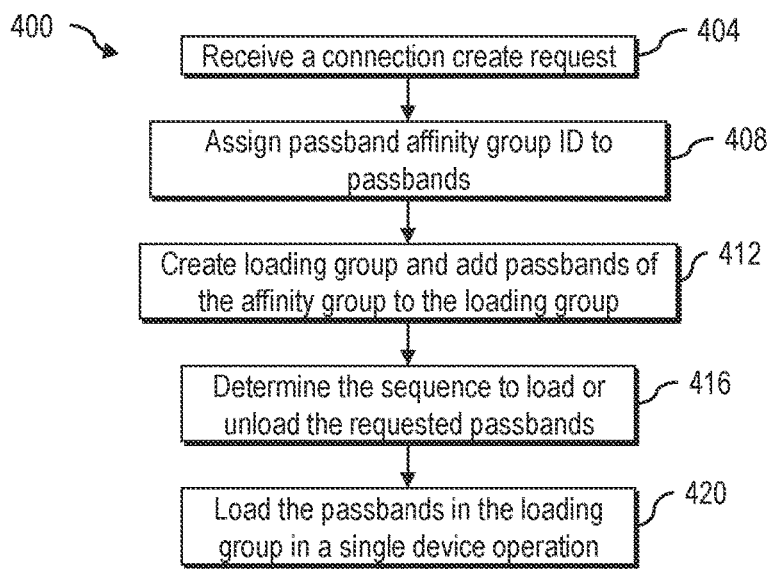
FIG. 8 is a flow diagram of another exemplary embodiment of a process constructed in accordance with the present disclosure.

Referring now to FIG. 8, shown therein is a flow diagram of an exemplary embodiment of a process 400 constructed in accordance with the present disclosure. The process 400 generally comprises the steps of: receiving a connection create request (step 404); assigning passband affinity group IDs to each passband (step 408); creating a loading group based on passbands in the affinity group (step 412); determining a sequence to load or unload the requested passbands (step 416); and loading the passbands in each loading group (step 420). Generally, the process 350 may be implemented as processor-executable code stored in the memory 94, for example, as the application 96, and executed by the processor 90.

In one embodiment, receiving a connection create request (step 404) comprises receiving the connection create request by the processor 90, e.g., via the communication network 34. In one embodiment, the connection create request is a request or notification to prepare the network element 14 and/or the WSS 108 to receive, route, and/or transmit one or more optical channel. The connection create request may include, for example, a passband ID indicative of an intent to bring up, or activate, one or more optical channel between the start frequency and end frequency of a passband corresponding to the passband ID. For example, the connection create request may have a passband ID, or is otherwise indicative of, the first optical channel 204b-1 (shown in FIG. 5).

In one embodiment, receiving a connection create request (step 404) comprises receiving the connection create request by the processor 186, e.g., via the processor 90. In one embodiment, the connection create request is a request or notification to load one or more optical channel into the optical signal. The connection create request may include, for example, a start frequency and an end frequency of one or more optical channels.

In one embodiment, assigning passband affinity group IDs to each passband (step 408) comprises determining whether any two optical channels of the one or more optical channels from the connection create request have a common destination and/or can be routed together. If two optical channels can be routed together, assign a passband affinity group ID to each of the two optical channels. In one embodiment, assigning the passband affinity group ID to each of the two optical channels includes saving an affinity group entity identifying the affinity group ID and each associated optical channel and/or the passband for each optical channel. Saving the affinity group entity may include, for example, saving the affinity group entity in the datastore 98, the memory 94 and/or the memory 188, for example.

In one embodiment, assigning passband affinity group IDs to each passband (step 408) comprises determining whether any two optical channel groups from the connection create request have a common destination and/or can be routed together. If two optical channel groups can be routed together, then, for each channel index in the optical channel group, assign a passband affinity group ID to the optical channel of each optical channel group at that channel index. In one embodiment, assigning the passband affinity group ID to the optical channel of each optical channel group includes saving an affinity group entity identifying the affinity group ID and each associated optical channel and/or the passband for each optical channel. Saving the affinity group entity may include, for example, saving the affinity group entity in the datastore 98, the memory 94 and/or the memory 188, for example.

In one embodiment, assigning passband affinity group IDs to each passband (step 408) may be repeated for each optical channel and/or each optical channel group in the connection create request.

In one embodiment, assigning passband affinity group IDs to each passband (step 408) includes receiving the passband affinity group IDs from the connection create request when the connection create request is instantiated by a user, e.g., when the ownership indicator 308a indicates user-managed.

In one embodiment, assigning passband affinity group IDs to each passband (step 408) includes first communicating with the WSS 108, e.g., from the processor 90 to the processor 186 to determine the minimum passband width for the WSS 108. In one embodiment, assigning the passband affinity group IDs to each passband may occur only when the width of at least one channel in the connection create request is less than the minimum passband width.

In one embodiment, assigning passband affinity group IDs to each passband (step 408) may include assigning passband affinity group IDs to each passband such that the bandwidth of the combined passbands is greater than the minimum passband width of the WSS 108.

In one embodiment, creating a loading group based on passbands in the affinity group (step 412) comprises creating the loading group with the ID provided by the affinity group ID and add each passband associated with the affinity group ID to the loading group. In this way, all optical channels that are part of a particular affinity passband group (e.g., based on the affinity group ID) are included in the same loading group.

In one embodiment, creating a loading group based on passbands in the affinity group (step 412) comprises creating the loading group such that the width of the loading group is greater than the minimum passband width of the WSS 108 through which the optical signal having the optical channel is routed.

In one embodiment, determining a sequence to load or unload the requested passbands (step 416) comprises sequencing each requested passband sharing the same passband affinity ID to be loaded or unloaded in a single loading or unloading operation.

In one embodiment, loading the passbands in the loading group in a single device operation (step 420) comprises causing the WSS 108 to provide a passband for a particular degree with the width of the loading group in response to a loading request, wherein the width of the loading group is greater than the minimum passband width of the WSS 108. In this way, in response to the loading request, all requested passbands in the loading group are loaded or unloaded together, i.e., the passband width at the WSS 108 required to load or unload the requested passbands is the width of all passbands in the loading group and greater than the minimum passband width.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A system, comprising:
    a wavelength selective switch having a minimum passband width;
    a processor; and
    a memory comprising a non-transitory processor-readable medium storing a datastore and processor-executable instructions that when executed by the processor cause the processor to: receive a connection create request comprising at least one optical channel;
        determine an affinity group ID of an affinity group associated with the requested at least one optical channel, the affinity group being associated with two or more adjacent optical channels, the two or more adjacent optical channels having a combined channel width equal to or greater than the minimum passband width of the wavelength selective switch;
        create a loading group based on the two or more adjacent optical channels associated with the affinity group;
        receive a loading request to load the at least one optical channel associated with the affinity group; and
        in response to receiving the loading request to load the at least one optical channel associated with the affinity group, load the two or more adjacent optical channels associated with the affinity group.

2. The system of claim 1, wherein the affinity group ID includes an entity type indicative of an optical channel group type.

3. The system of claim 2, wherein the affinity group ID further includes an entity data format comprising a first entity indicator, a second entity indicator, and a passband index indicator.

4. The system of claim 3, wherein the first entity indicator is indicative of a first optical channel group, the second entity indicator is indicative of a second optical channel group, and the passband index indicator is indicative of a channel index within each optical channel group.

5. The system of claim 1, wherein the connection create request comprises a first optical channel and a second optical channel, the first optical channel having a first start frequency and a first bandwidth and the second optical channel having a second start frequency and a second bandwidth, the second start frequency being separated from the first start frequency by the first bandwidth, the combined channel width being a summation of the first bandwidth and the second bandwidth.

6. The system of claim 1, wherein the minimum passband width is 37.5 GHz and wherein the combined channel width is 50 GHz.

7. A system, comprising:
    a wavelength selective switch having a minimum passband width;
    a processor; and
    a memory comprising a non-transitory processor-readable medium storing a datastore and processor-executable instructions that when executed by the processor cause the processor to:
        receive a connection create request comprising at least one optical channel;
        assign a passband affinity group ID to at least two optical channels thereby forming an affinity group, the at least two optical channels having a combined channel width equal to or greater than the minimum passband width;
        associate the affinity group with the requested at least one optical channel;
        create a loading group based on passbands in the affinity group;
        determine a sequence to load or unload the requested at least one optical channel associated with the affinity group;
        receive a loading request to load the requested at least one optical channel associated with the affinity group; and
        in response to receiving the loading request to load the requested at least one optical channel associated with the affinity group, load the at least two optical channels associated with the affinity group.

8. The system of claim 7, wherein loading optical channels associated with the affinity group further includes loading optical channels associated with the affinity group in a single loading operation.

9. The system of claim 7, wherein the passband affinity group ID includes an entity type indicative of an optical channel group type.

10. The system of claim 9, wherein the passband affinity group ID further includes an entity data format comprising a first entity indicator, a second entity indicator, and a passband index indicator.

11. The system of claim 10, wherein the first entity indicator is indicative of a first optical channel group, the second entity indicator is indicative of a second optical channel group, and the passband index indicator is indicative of a channel index within each optical channel group.

12. The system of claim 7, wherein the connection create request comprises at least a first optical channel and a second optical channel, the first optical channel having a first start frequency and a first bandwidth and the second optical channel having a second start frequency and a second bandwidth, the second start frequency being separated from the first start frequency by the first bandwidth, the combined channel width being a summation of the first bandwidth and the second bandwidth.

13. The system of claim 12, wherein the minimum passband width is 37.5 GHz and wherein the first bandwidth and the second bandwidth are 25 GHz.

14. The system of claim 7, wherein the memory further stores processor-executable instructions that cause the processor to:
communicate with the wavelength selective switch to determine the minimum passband width prior to assigning the passband affinity group ID.

15. The system of claim 7, wherein receiving the connection create request further comprises receiving the connection request for at least a first optical channel having a first destination and a second optical channel having a second destination, and wherein assigning the passband affinity group ID further includes:
determining whether the first destination of the first optical channel and the second destination of the second optical channel are similar; and
storing an affinity group entry having an affinity group ID and a first entity indicator indicative of the first optical channel and a second entity indicator indicative of the second optical channel.

16. The system of claim 7, wherein receiving the connection create request further comprises receiving the connection request for at least a first optical channel group having a first destination and a second optical channel group having a second destination, and wherein assigning the passband affinity group ID further includes:
determining whether the first destination of the first optical channel group and the second destination of the second optical channel group are similar; and
for each channel index in the first optical channel group and the second optical channel group, storing an affinity group entry having an affinity group ID and a first entity indicator indicative of a first optical channel at the channel index in the first optical channel group and a second entity indicator indicative of a second optical channel at the channel index in the second optical channel group.

17. A method, comprising:
receiving a connection create request comprising at least one optical channel;
assigning a passband affinity group ID to at least two optical channels thereby forming a passband affinity group, the at least two optical channels having a combined channel width greater than the minimum passband width;
associating the affinity group with the requested at least one optical channel;
creating a loading group based on passbands in the affinity group;
determining a sequence to load or unload the requested optical channels;
receiving a loading request to load the requested at least one optical channel associated with the affinity group; and
in response to the loading request to load the requested at least one optical channel associated with the affinity group, load optical channels associated with the affinity group.

18. The method of claim 17, wherein receiving the connection create request further comprises receiving the connection request for at least a first optical channel having a first destination and a second optical channel having a second destination, and wherein assigning the passband affinity group ID further includes:
determining whether the first destination of the first optical channel and the second destination of the second optical channel are similar; and
storing an affinity group entry having an affinity group ID and a first entity indicator indicative of the first optical channel and a second entity indicator indicative of the second optical channel.

19. The method of claim 17, wherein receiving the connection create request further comprises receiving the connection request for at least a first optical channel group having a first destination and a second optical channel group having a second destination, and wherein assigning the passband affinity group ID further includes:
determining whether the first destination of the first optical channel group and the second destination of the second optical channel group are similar; and
for each channel index in the first optical channel group and the second optical channel group, storing an affinity group entry having an affinity group ID and a first entity indicator indicative of a first optical channel at the channel index in the first optical channel group and a second entity indicator indicative of a second optical channel at the channel index in the second optical channel group.

* * * * *